United States Patent
Bandyopadhyay et al.

(10) Patent No.: US 6,872,325 B2
(45) Date of Patent: Mar. 29, 2005

(54) POLYMERIC RESIN BONDED MAGNETS

(75) Inventors: Krisanu Bandyopadhyay, West Bengal (IN); Kunj Tandon, Bangalore (IN); Amit Chakrabarti, West Bengal (IN)

(73) Assignee: General Electric Company, Pittsfield, MA (US)

( * ) Notice: Subject to any disclaimer, the term of this patent is extended or adjusted under 35 U.S.C. 154(b) by 311 days.

(21) Appl. No.: 10/238,435

(22) Filed: Sep. 9, 2002

(65) Prior Publication Data
US 2004/0045635 A1 Mar. 11, 2004

(51) Int. Cl.$^7$ .......................... C04B 35/04; H01F 1/00; H01F 1/26
(52) U.S. Cl. ................ 252/62.54; 252/62.55; 252/62.56; 252/62.6; 252/62.62; 252/62.64; 264/109; 264/122; 264/123; 264/126; 264/437
(58) Field of Search ............... 252/62.54, 62.55, 252/62.56, 62.6, 62.62, 62.64; 264/437, 109, 123, 126, 122

(56) References Cited

U.S. PATENT DOCUMENTS 5,100,604 A * 3/1992 Yamashita et al. .......... 264/115
5,149,477 A * 9/1992 Yamashita et al. .......... 264/112
5,886,070 A * 3/1999 Honkura et al. ............ 523/300

FOREIGN PATENT DOCUMENTS

| JP | 08217970 | 2/1995 |
| JP | 09012869 | 6/1995 |
| JP | 2000109684 | 1/1998 |

OTHER PUBLICATIONS

Fiske, Thomas J.et. al. in J. Appl. Polym Sci. (1997) vol. 65(7), 1371–1377.
US 2002/0023693 A1—Feb. 28, 2002—Manufacturing Soft Magnetic Components Usinga Ferrous Powder and a Lubricant—Lebebvre, et. al.

* cited by examiner

Primary Examiner—Stephen J. Lechert, Jr.

(57) ABSTRACT

Briefly, in accordance with one embodiment of the present invention, a process for making a magnetic composite which comprises providing a polymeric resin and a magnetic powder, the magnetic powder having a mean particle size with a value for standard deviation that is less than the value for the mean particle size of the said magnetic powder, the said magnetic composite being made by mixing said magnetic powder with said polymeric resin and molding the said mixture into a desired shape and a size and said magnetic composite having a magnetic permeability between 30 and 50. In another embodiment the present invention is a composition for a magnetic composite comprising a polymeric resin and a magnetic powder, the said powder having a mean particle size with a value of standard deviation that is less than the value of the mean particle size of the magnetic powder, wherein said magnetic composite has a magnetic permeability between about 30 and about 50.

33 Claims, No Drawings

US 6,872,325 B2

POLYMERIC RESIN BONDED MAGNETS

BACKGROUND OF THE INVENTION

The present invention relates to a magnetic composition and more specifically to a method for producing a polymeric resin bonded magnetic composition and magnetic composites comprising such a composition.

In recent years, in accordance with the diversification and microminiaturization of electronic devices, parts and the like, magnetic moldings with complicated forms or microstructures have been required in various technical fields. Generally, magnetic moldings are produced by pressing magnetic powder such as ferrite powder and then sintering the pressed magnetic powder at a temperature of at least 1000° C. However, the moldings are often contracted when the pressed magnetic powder is sintered, and the production cost is high since the yield is markedly lowered when producing moldings that have complicated forms or microstructures. Further, such magnetic moldings are difficult to process mechanically, and the obtained magnetic moldings are brittle and easily chipped. Therefore, the development of a complicated and microstructural shapes is required to solve these problems for applications in various technical fields.

A known polymeric resin-bonded magnetic composition used as a magnetic core for a transformer and the like is produced by mixing iron powder or ferrite powder with polymeric resin Components such as polyphenylene sulfide, polyalkylene terephthalate, polyetifylene, polypropylene, polybutene, polyvinyl chloride, or acrylonitrile-butadiene-styrene resin. The methods described in U.S. Pat. No. 6,338,900 provide a means of obtaining an injection moldable magnetic composite but the initial magnetic permeability is less than 30 due to low loading of magnetic material, which low loading is necessary to make the composite moldable. Therefore, there exists a need to develop a polymeric resin bonded magnetic composite that exhibits permeability characteristics that are required by the electrical and electronic industries. Typical uses of such magnetic composites lie in the areas of filters for power supplies, choke coils for video systems, motors and stators, transformer cores and the like.

BRIEF SUMMARY OF THE INVENTION

Briefly, in one embodiment the present invention is a method to make a magnetic composite which comprises providing a polymeric resin and a magnetic powder, the said magnetic powder having a mean particle size with a value for standard deviation that is less than the value for the mean particle size of the magnetic powder, the said magnetic composite being made by mixing magnetic powder with the polymeric resin, and molding the mixture into a desired shape and size and said magnetic composite having a magnetic permeability between 30 and 50. In another embodiment the present invention is a composition for a magnetic composite comprising a polymeric resin and a magnetic powder, the said powder having a mean particle size with a value of standard deviation that is less than the value of the mean particle size of the magnetic powder, wherein said magnetic composite has a magnetic permeability between about 30 and about 50.

DETAILED DESCRIPTION OF THE INVENTION

Described in this application is a polymeric resin-bonded magnetic composition typically having heat stability, excellent moldability, mechanical workability, mechanical strength, magnetic permeability arid energy maximum values. The features of the present invention have been achieved by using a narrow size distribution of magnetic powders dispersed in a polymeric resin, the resin possessing the characteristics of high heat stability and mechanical strength and the magnetic composite exhibiting exceptional permeability.

Examples of magnetic powder employed in the present invention include, but are not limited to, ferrite powder, iron powder, nanocrystalline iron powder, cobalt-compound powder such as borocube, rare earth cobalt powder, samarium cobalt powder, alnico powder, amorphous Fe—B—Si—C powder, amorphous Fe—Si—B magnetic powder, Nd—Fe—B powder, powders of alloys of iron and nickel containing more than 30 wt. % nickel such as permalloy powder, and the like. These powders may be applied alone or in combination thereof. Among them, ferrite powder is used in a particular embodiment in the present invention since it is typically excellent in moldability. These magnetic powders have a particle size of at most about 150 microns (100 mesh).

Ferrite powder useful in the practice of the present invention comprises a compound ($MO-Fe_2O_3$) composed of ferric oxide ($Fe_2O_3$) and an oxide ($MO$) of a divalent metal and is generally produced as a sintered material through steps which may comprise mixing, calcination, grinding, granulation, molding, and sintering of the raw materials. In other embodiments, ferrite powder is produced by a co-precipitation process or by an atomization and thermal decomposition process. Typical raw materials include $Fe_2O_3$, $MnO_2$, MnCO 3, CuO, NiO, ZnO, etc. Ferrites are classified into various kinds, for example, Mn—Zn, Mg—Zn, Ni—Zn, Cu, Cu—Zn, Cu—Zn—Mg, and Cu—Ni—Zn types, according to the kinds of oxides ($MO$) of divalent metals that are present. In some particular embodiments, the present method can bring about excellent effects when it is applied to Ni—Zn ferrite, Mg—Zn ferrite and Cu ferrite. In another particular embodiment excellent effects can be brought about when applied to the Mg—Zn ferrite.

Hard magnetic composites may be made by bonding magnetic powders with polymeric resins in the presence of a magnetic field. Materials used in the preparation of hard magnetic composites in the present invention include, but are not limited to alnico powder, cobalt powder, amorphous Fe—Si—B powder as well as Nd—Fe—B powders. These magnetic powders, when molded with a polymeric resin can be used in a variety of applications. These applications include transformer cores, motors, stators, sensors and other such applications. Hard magnets are characterized by the maximum energy product value. This is tile BH value and is a product of the magnetic flux and magnetic force. This value is a measure of the strength of the magnet. In the making of hard magnetic composites, the alignment of the particles of the magnetic powder may be effected in an injection molder or some similar molding device. The composition may he injected when the composition is in a fluid state. The magnetic field is then positioned adjacent to the mould in order to align the magnetic powder with the direction of the applied field. The composition with aligned magnetic powder is then cooled till the mixture hardens, after which it is removed from the molding device. For soft magnets, which become magnetized in the presence of a magnetic field, the measurement parameter is the permeability value, defined as the ratio of the magnetic flux to field strength.

One of the characteristics of the present invention is that the magnetic powder used has a mean particle size in one embodiment in a range of from about 5 microns to about 150 microns. In another embodiment, the mean particle size of the magnetic powder varies from about 25 microns to about 150 microns. In another embodiment, the mean particle size of the magnetic powder varies from about 25 microns to about 55 microns. The magnetic powder of the present method may include magnetic Fe powder with a mean size from about 30 microns to about 110 microns. Similarly, ferrite powder may have a mean size from about 5 microns to about 50 microns. In one embodiment of the present invention, the alnico powder used may have a mean size that varies from about 20 microns to about 75 microns. Moreover, the magnetic powder of the present invention can be a mixture of Mn—Zn ferrite and Fe. Measurement of particle size distribution is well known to those skilled in the art and may be used when required. One of the most common methods of measuring particle size distribution is a sieve analysis. The method involves passing the material through openings of a particular size in a screen. The particle size distribution is then reported as the weight percent retained on the top of standard sieves of decreasing size and the percentage passed off the finest size sieve. Standard deviations may then be calculated using the expression for the parameter.

In various embodiments the magnetic powder has a mean particle size with a value for standard deviation of less than the value for the mean particle size of the magnetic powder. In one particular embodiment the magnetic powder has a mean particle size with a value for standard deviation of less than about 150 micrometers. In another particular embodiment the magnetic powder has a mean particle size with a value for standard deviation of less than about 110 micrometers. In another particular embodiment the magnetic powder has a mean particle size with a value for standard deviation of less than about 75 micrometers In another particular embodiment the magnetic powder has a mean particle size with a value for standard deviation of less than about 55 micrometers. In another particular embodiment the magnetic powder has a mean particle size with a value for standard deviation of less than about 40 micrometers. In another particular embodiment the magnetic powder has a mean particle size with a value for standard deviation of less than about 25 micrometers. In still another particular embodiment, the present inventors have found that when the value for standard deviation of the particle size is less than about 20 micrometers the initial permeability of the said magnetic composite is appreciable.

To produce homogeneously oriented magnetic composites, magnets made for example from ferrite powder, rare earth cobalt powder, samarium cobalt powder, alnico powder or Nd—Fe—B magnetic powder, one must have a powder consisting mostly of single crystals. This is usually done by presaturating the powder particles and applying a homogeneous magnetic field to orient them before compaction by pressing. Hard magnetic ferrites, properly ball-milled break into basal plane platelets that can be homogeneously oriented by mechanical means such as rolling or extending without the aid of a magnetic field. Homogeneously oriented cast magnets as for example alnico are manufactured by casting the material at a high temperature in a mold with heated side walls but chilled bottom faces so as to produce a casting with elongated columnar grains in which one of the crystallographic axes in every grain is parallel or nearly parallel.

Amorphous magnetic powders are magnetic materials such as iron and cobalt that have been melted and cooled extremely quickly. Amorphous materials have interesting properties and are used in transformer, magnetic field sensors, read head device for disk drives and in other electronics and computer applications. Whereas cooling extremely slowly creates crystals with a regular lattice, rapid cooling causes the atoms to be in a complete disarray. Amorphous magnetic powders may be used in magnetic composites. Amorphous powders of the general composition Fe—B—Si—C have been used to achieve appreciable magnetic flux density. Powders of this type are produced by quenching a melt of Fe, B and C. By adding small amounts of Si it is possible to achieve remarkable saturation density values while retaining the amorphous phase formability. Carbon is added to the composition to improve melt flowability as well as wetability with respect to cooling.

The total magnetic powder in the composite can be as high as 97% of the composite weight. The magnetic composite materials in various embodiments contain resin compositions from about 50 to about 97 weight. % of the powdered magnetic material and from about 3 to about 50 weight. % of polymeric resin. If the amount of the powdered magnetic material is less than about 50 weight % it may be difficult to attain sufficient permeability in the resulting composition. If the amount of the powdered magnetic material exceeds about 97 weight. % on the other hand, it has been found that the flowability of the resulting resin composition during injection molding may suffer. In one particular embodiment, a polymeric resin bonded magnet system of the present invention comprises about 80% to about 97% of magnetic powder and about 20% to about 3% by weight of resin powder. In another embodiment about 90% to about 95% of the magnetic powder and about 10% to about 5% of the polymeric resin is used, while in still another embodiment about 91% to about 94% of the magnetic powder and about 9% to about 6% of the polymeric resin is used.

Examples of the polymeric resin useful in the practice of the present invention include thermoplastic polymers including, but not limited to, polysulfides, polyolefins such as polyethylene, polypropylene, ethylene-vinyl-acetate copolymers and ionomers; polyamides such as nylon 6, nylon 66, nylon 12 and nylon 6/66; poly(arylene sulfides) such as poly(phenylene sulfide) and poly(phenylene sulfide-ketone); polyesters such as polyethylene terephthalate, polybutylene terephthalate, poly(cyclohexanedimethanol terephthalate), poly(trimethylene terephthalate) and poly (cyclohexanedimethanol terephthalate-co-ethylene terephthalate) and polyarylates; polyimide resins such as polyimide, polyetherimide and polyamideimide; styrene resins such as polystyrene, ABS and acrylonitrile-styrene copolymers; chlorine-containing vinyl resins such as polyvinyl-chloride, polyvinylidene chloride, vinyl chloride/ vinylidene chloride copolymers and chlorinated polyethylene; polyacrylates and polymethacrylates such as polymethyl acrylate and polymethylmethacrylate; acrylonitrile resins such as polyacrylonitrile and polymethacrylonitrile; liquid crystalline polymers, thermoplastic fluorocarbon resins such as tetrafluoroethylene/perfluoroalkyl vinyl ether copolymers, tetrafluoroethylene/ hexafluoropropylene copolymers and polyvinylidene fluoride; silicone resins such as polydimethylsiloxane; polyphenylene ether, alloys of polyphenylene ethers, polyetheretherketone, polyetherketone, polysulfone and polyethersulfone; polyacetal, polycarbonate, polyvinyl acetate, polyvinylformal, polyvinylbutyral, polybutylene, polyisobutylene, polymethylpentene, butadiene resins, polyethylene oxide, polypropylene oxide, elastomers such as ethylene-propylene rubber, polybutadiene rubber, styrene-butadiene rubber and chloroprene rubber; thermoplastic elastomers such as styrene-butadiene-styrene block copolymers; and mixtures of two or more of any of these polymers. Of these polymeric resins, polyolefins such as polyethylene and polypropylene and polyamides are often used from the viewpoint of moldability. From the viewpoints of heat-resistance, chemical-resistance, flame retardancy, weather resistance, electrical properics, moldability, dimensional stability, and dielectric strength, poly(arylene sulfides) are often used.

The composition may, optionally, further comprise one or more additives known in the art and ordinarily incorporated in resin compositions. Such additives include, for example, fillers and reinforcing agents; heat stabilizers; antioxidants; light stabilizers; plasticizers; antistatic agents; mold releasing agents; additional resins; blowing-agents, and the like. Various kinds of fillers such as fibrous fillers, plate-like fillers and spherical fillers may be incorporated in the magnetic composites. Examples of fillers or reinforcing agents include glass fibers, asbestos, carbon fibers, silica, talc, mica, calcium carbonate, and the like. Examples of heat stabilizers include triphenyl phosphite, tris-(2,6-dimethylphenyl) phosphite, tris-(mixed mono-and di-nonylphenyl) phosphite, tris-(2,4-di-t-butylphenyl) phosphite, and the like. Examples of light stabilizers include benzotriaizoles such as 2-(2-hydroxy-5-methylphenyl)-benzotriazole, 2-(2-hydroxy-5-tert-octylphenyl)-benzotriazole, 2-hydroxy-4-n-and the like. Examples of plasticizers include dioctyl-4,5-epoxy-hexahydrophthalate, bis-(octyloxycarbonylethyl) isocyanurate, tristearin, epoxidized soybean oil, and the like. Examples of the antistatic agents include glycerol monostearate, sodium stearylsulfonate, pentaerythritoltetrastearate, sodium dodecylbenzenesulfonate, and the like. Examples of mold releasing agents include stearyl stearate, beeswax, montan wax, paraffin wax, and the like. Combinations of any of the foregoing additives may be used. Such additives may be combined at a suitable time during the mixing of the components for forming the composition.

In various embodiments, magnetic composites show permeability between about 30 and about 75 when the magnetic powders are loaded from about 80% to about 95% by weight, the permeabilities being higher when the magnetic powders are used at about 97% by weight of the composite. In a particular embodiment, when a magnetic field is applied during molding, the molded magnetic composite has an excellent energy maximum value. In various embodiments, magnetic composites show suitable permeability when the magnetic powder has a mean particle size with a value for standard deviation less than about 50 microns. In other embodiments, magnetic composites of the present invention show permeability values from about 30 to about 50 when magnetic powders of mean particle size with a value for standard deviation less than about 40 microns are used. In still other embodiment, magnetic composites show permeabilities from about 30 to about 70 when the magnetic powder has mean particle size of at most 100 micrometers. In one embodiment, the magnetic composite of the present invention shows exemplary energy max values when the magnetic filler used is a neodymium magnetic powder with a mean particle size of at most 100 micrometers. In another embodiment, magnetic composites show enhanced permeability when amorphous B—Fe—Si powder is used. The permeability is also excellent when the magnetic filler used is nanocrystalline iron. In another embodiment, good permeability values are seen when an alnico powder is used with a mean particle size of at most 100 microns. In another embodiment, permalloy powders when used in the making of the composite magnet give exemplary permeability values, especially when the mean particle size used is less than about 150 micrometers.

The magnetic composite materials can be produced by uniformly mixing the respective components. In one embodiment of the present invention, the magnetic materials can be produced by uniformly mixing the respective components at temperature that is in a range of from about the softening point of the polymeric resin employed to about 750DC. In another embodiment of the present invention, the components are mixed at a temperature that is in a range of from about 100° C. to about 750° C. In another embodiment of the present invention, the components are mixed at a temperature that is in a range of from about 200° C. to about 500° C. and in still another embodiment, the components are mixed at a temperature that is in a range of from about 250° C. to about 300° C. There is no limitation on the method by which the said composite may be prepared. In one embodiment the prescribed amounts of the powdered magnetic material and the polymeric resin are mixed in the mixture, melted and kneaded, whereby a moldable magnetic material is produced. For example, a mixer such as a Henschel mixer mixes the prescribed amounts of the powdered magnetic material and polymer, and the mixture is melted and kneaded. The magnetic material can be formed into molded or formed products of the desired shape by various kinds of molding or forming operations such as, but not limited to, injection molding, and compression molding. The molded or formed products thus obtained have excellent dielectric strengths and good permeability. A magnetic field can be applied before the blended mixture is cooled and molded. In one embodiment of the present invention, a magnetic field of about 2 to about 50 kilo-oersteds is applied while in a second embodiment, a magnetic field of about 5 to about 35 kilo-oersteds is applied during the making of the magnetic composite. In a third embodiment, the magnetic field applied varies from about 10 to about 30 kilo-oersteds.

Without further elaboration, it is believed that one skilled in the art can, using the description herein, utilize the present invention to its fullest extent. The following examples are included to provide additional guidance to those skilled in the art in practicing the claimed invention. While some of the examples are illustrative of various embodiments of the claimed invention, others are comparative. The examples provided are merely representative of the work that contributes to the teaching of the present application. Accordingly, these examples are not intended to limit the invention, as defined in the appended claims, in any manner. The present method will now be described through the following examples, in which reference is made to the Table below.

Absolute magnetic permeability could be determined as the ratio of magnetic induction to that of the magnetic field. Relative permeability is the ratio of the absolute permeability to the permeability of air. Permeabilities were measured using an impedance analyzer by measuring the impedance at 25° C. at different frequencies. Permeability measurements were done using toroidal shaped samples. The system uses an induction method to measure relative permeability. Specifically, a standard impedance analyzer with a magnetic measurements setup measures impedance of an inductor and calculates complex permeability from impedance. Morphological analyses of composite samples of ferrites or iron at different loadings of the powders were done using SEM after cold fracturing the sample followed by polishing.

EXAMPLE 1

Iron powder (CAI-100) with mean particle size 53 microns and median particle size of 48 microns was used as received from Hogonas, India Iron powder was mixed with nylon 6 powder. The mixture was put into Haake Rheomix (batch mixer). The temperature was maintained at 250° C. and mixed at a rotor speed of 50 rpm. Mixing time was 10 minutes after which the mixture was poured out of the internal mixer. The compounded material was then removed and dried for 1 hour in all air oven at 100° C. The mixture was compression molded under the following conditions: Preheat time 300 seconds; venting time 600 seconds full pressing 300 seconds; plate temperature 250° C. Applied pressure was 60 kiloNewtons. Shape of sample was a disk with 20.0 mm diameter and height 8.95mm (Set Table 1). Loading of iron powder in Nylon matrix was varied from 80 ,weight percent to 97.5 weight percent. SEM pictures of composites formed from received powders are shown in the particle resin surface is large. The initial magnetic permeability was measured using Agilent Impedance analyzer with the permeability set-up. The magnetic permeability had a maximum value of about 18 at 100kHz at the highest loading. The magnetic permeability increased monotonically with loading.

TABLE 1

| Filler Type | Mean particle size of filler (micron) | Wt % | Permeability |
|---|---|---|---|
| Fe powder | 100 | 90 | 9.9 |
| Ni Zn Ferrite | 10 | 97.5 | 11.7 |
| Mn Zn Ferrite | 10 | 92.5 | 15.3 |
| Mn Zn Ferrite | 10 | 97.5 | 17.9 |
| Fe powder | 100 | 95 | 17.5 |
| Ni Zn Ferrite | 10 | 97.5 | 11.2 |
| Ni Zn Ferrite | 10 | 92.5 | 8.9 |
| Ni Zn Ferrite | 10 | 95 | 10.1 |
| Mn Zn Ferrite | 10 | 97.5 | 17.8 |
| Fe powder | 100 | 97.5 | 19.9 |
| Ni Zn Ferrite | 10 | 90 | 8.0 |

EXAMPLE 2

The method of example 1 was used but iron powder used was 10–40 microns and at a loading of 95%. (See Table 1). This iron powder had particle size distribution with mean of 38 microns, a median of 41 microns an(d a standard deviation of 18 microns. These are chemically the same powders as in Example 1 but sieved to obtain the narrow particle size distribution. The composite was formed for a filler loading of 95 and 97.5 weight percent like in Example 1. The initial magnetic permeability was measured as in Example 1. The permeability showed a significant improvement over the as received powder composites.

EXAMPLE 3

The method of example 1 was used but iron powder used was sieved with sieves of 125 and 150 microns. This iron powder had particle size distribution with mean of 128 microns, a median of 129 microns and a standard deviation of 58 microns. These were chemically the same powders as in Example 1 but sieved to obtain the narrow particle size distribution. The composite was formed for a filler loading of 95 and 97.5 weight percent exactly as in Example 1. The Figure shows smaller resin particle interface. The initial magnetic permeability was measured as in Example 1. The permeability showed a significant improvement over the as received powder composites and is a consequence of reduced particle-resin interface.

EXAMPLE 4

The method of Example 1 was used with Nd—B—Fe powder (mean size 30 microns), alnico powder (mean size 25 microns) and amorphous iron powder (mean size 40 microns) and the compression was carried out in the presence of a magnetic field of an alignment of 18 kilo-oersteds. This was followed by an assessment of the magnetic force.

What is claimed is:

1. A method for making a magnetic composite comprising the steps of:
   i) providing a polymeric resin;
   ii) providing a magnetic powder having a mean particle size with a value for standard deviation less than the value for the mean particle size of the magnetic powder;
   iii) mixing said polymeric resin and said magnetic powder into a mixture; and
   iv) molding said mixture into a desired shape and a size;
   wherein said magnetic composite has a magnetic permeability between about 30 and about 50.

2. The method of claim 1 wherein the magnetic powder is at least one powder selected from the group consisting of ferrite powder, iron powder, nanocrystalline iron powder, cobalt-compound powder, rare earth cobalt powder, alnico powder, amorphous Fe—B—Si—C powder, amorphous Fe—Si—B magnetic powder, Nd—Fe—B powder, powders of alloys of iron and nickel containing more than 30 wt. % nickel, and mixtures thereof.

3. The method of claim 1 wherein the magnetic powder is a ferrite of the form $MO-Fe_2O_3$, wherein MO is a divalent oxide of a metal selected from the group consisting of Mn, Mg, Zn, Ni, Cr, Cu, Co and mixtures thereof.

4. The method of claim 1 wherein the polymeric resin is chosen from the group consisting of polyolefins, polyethylene, polypropylene, ethylene-vinylacetate copolymers, ionomers; polyamides, nylon 6, nylon 66, nylon 12, nylon 6/66; poly(arylene sulfides), poly(phenylene sulfide), poly(phenylene sulfide-ketone); polyesters, polyethylene terephthalate, polybutylene terephthalate, poly(cyclohexanedimethanol terephthalate), poly(trimethylene terephthalate), poly(cyclohexanedimethanol terephthalate-co-ethylene terephthalate), polyarylates; polyimides, polyetherimides, polyamideimides; styrene resins, polystyrene, ABS, acrylonitrile-styrene copolymers; chlorine-containing vinyl resins, polyvinylchloride, polyvinylidene chloride, vinyl chloridelvinylidene chloride copolymers, chlorinated polyethylene; polyacrylates, polymethacrylates, polymethyl acrylate, polymethylmethacrylate; acrylonitrile resins, polyacrylonitrile, polymethacrylonitrile; liquid crystalline polymers, thermoplastic fluorocarbon resins, tetrafluoroethylene/perfluoroalkyl vinyl ether copolymers, tetrafluoroethylene/hexafluoropropylene copolymers, polyvinylidene fluoride; silicone resins, polysiloxanes, polydimethylsiloxane; polyphenylene ether, alloys of polyphenylene ethers, polyketones, polyetheretherketone, polyetherketone, polysulfones, polyethersulfones; polyacetals, polycarbonates, polyvinyls, polyvinyl acetate, polyvinylformal, polyvinylbutyral, polybutylene, polyisobutylene, polymethylpentene, butadiene resins, polybutadiene, polyethylene oxide; polypropylene oxide; elastomers, thermoplastic elastomers, ethylene-propylene rubber, polybutadiene rubber, styrene-butadiene rubber, chloroprene rubber; styrene-butadiene-styrene block copolymers; and mixtures of two or more of any of these resins.

5. The method of claim 1 wherein the polymeric resin is chosen from nylon-6, liquid crystalline polymers, polycarbonates, polyolefins, polyethylene, polypropylene, poly(arylene sulfides), polyphenylene sulfide, polyphenylene ethers, alloys of polyphenylene ether, polystyrenes, polyetherketone, and mixtures of two or more of any of these resins.

6. The method of claim 1 wherein the magnetic powder comprises between about 50% and about 99% of the composite weight.

7. The method of claim 1 wherein the magnetic powder comprises between about 70% and about 95% of the composite weight.

8. The method of claim 1 wherein the magnetic powder is sieved to produce a mean particle size that has a value for standard deviation less than the value for the mean size of the powder used.

9. The method of claim 1 wherein the magnetic powder has a mean particle size from about 5 microns to about 150 microns.

10. The method of claim 1 wherein the magnetic powder has a mean particle size from about 25 microns to about 100 microns.

11. The method of claim 1 wherein the magnetic powder has a mean particle size from about 35 microns to about 55 microns.

12. The method of claim 1 wherein the magnetic powder has a mean particle size with a value of standard deviation less than about 150 microns.

13. The method of claim 1 wherein the magnetic powder has a mean particle size with a value of standard deviation less than about 75 microns.

14. The method of claim 1 wherein the magnetic powder has a mean particle size with a value of standard deviation less than about 50 microns.

15. The method of claim 1 wherein the magnetic powder has a mean particle size with a value of standard deviation less than about 20 microns.

16. The method of claim 1 wherein the magnetic composite contains mold release agents selected from the group consisting of stearyl stearate, beeswax, montan wax, paraffin wax and combinations thereof.

17. The method as claimed in claim 1 wherein said particles of magnetic powder of the said mixture of step (iii) are subjected to an applied magnetic field during the molding of step (iv).

18. A composition for a magnetic composite comprising a polymeric resin and a magnetic powder, the said powder having a mean particle size with a value of standard deviation that is less than the value of the mean particle size of the magnetic powder, wherein said magnetic composite has a magnetic permeability between about 30 and about 50.

19. The composition for a magnetic composite of claim 18 wherein the magnetic powder is at least one magnetic powder selected from the group consisting of ferrite powder, iron powder, nanocrystalline iron powder, cobalt-compound powder, rare earth cobalt powder, alnico powder, amorphous Fe—B—Si—C powder, amorphous Fe—Si—B magnetic powder, Nd—Fe—B powder, powders of alloys of iron and nickel containing more than 30 wt. % nickel, and mixtures thereof.

20. The composition for a magnetic composite of claim 18 wherein the magnetic powder is a ferrite of the form MO—$Fe_2O_3$, wherein MO is a divalent oxide of a metal selected from the group consisting of Mn, Mg, Zn, Ni, Cr, Cu, Co and mixtures thereof.

21. The composition for a magnetic composite of claim 18 wherein the polymeric resin is chosen from the group consisting of polyolefins, polyethylene, polypropylene, ethylene-vinylacetate copolymers, ionomers; polyamides, nylon 6, nylon 66, nylon 12, nylon 6/66; poly(arylene sulfides), poly(phenylene sulfide), poly(phenylene sulfide-ketone); polyesters, polyethylene terephthalate, polybutylene terephthalate, poly(cyclohexanedimethanol terephthalate), poly(trimethylene terephthalate), poly(cyclohexanedimethanol terephthalate-co-ethylene terephthalate), polyarylates; polyimides, polyetherimides, polyamideimides; styrene resins, polystyrene, ABS, acrylonitrile-styrene copolymers; chlorine-containing vinyl resins, polyvinylchloride, polyvinylidene chloride, vinyl chloride/vinylidene chloride copolymers, chlorinated polyethylene; polyacrylates, polymethacrylates, polymethyl acrylate, polymethylmethacrylate; acrylonitrile resins, polyacrylonitrile, polymethacrylonitrile; liquid crystalline polymers, thermoplastic fluorocarbon resins, tetrafluoroethylene/perfluoroalkyl vinyl ether copolymers, tetrafluoroethylene/hexafluoropropylene copolymers, polyvinylidene fluoride; silicone resins, polysiloxanes, polydimethylsiloxane; polyphenylene ether, alloys of polyphenylene ethers, polyketones, polyetheretherketone, polyetherketone, polysulfones, polyethersulfones; polyacetals, polycarbonates, polyvinyls, polyvinyl acetate, polyvinylformal, polyvinylbutyral, polybutylene, polyisobutylene, polymethylpentene, butadiene resins, polybutadiene, polyethylene oxide; polypropylene oxide; elastomers, thermoplastic elastomers, ethylene-propylene rubber, polybutadiene rubber, styrene-butadiene rubber, chloroprene rubber; styrene-butadiene-styrene block copolymers; and mixtures of two or more of any of these resins.

22. The composition for a magnetic composite of claim 21 wherein the polymeric resin is chosen from nylon-6, liquid crystalline polymers, polycarbonates, polyolefins, polyethylene, polypropylene, poly(arylene sulfides), polyphenylene sulfide, polyphenylene ethers, alloys of polyphenylene ether, polystyrenes, polyetherketones, and mixtures of two or more of any of these resins.

23. The composition for a magnetic composite of claim 18 wherein the magnetic powder comprises between about 50 % and about 99 % of the composite weight.

24. The composition for a magnetic composite of claim 18 wherein the magnetic powder comprises between about 70 % and about 95 % of the composite weight.

25. The composition for a magnetic composite of claim 18 wherein the magnetic powder is sieved to produce a mean particle size that has a value for standard deviation less than the value for the mean size of the powder used.

26. The composition for a magnetic composite of claim 18 wherein the magnetic powder has a mean particle size from about 5 microns to about 150 microns.

27. The composition for a magnetic composite of claim 18 wherein the magnetic powder has a mean particle size from about 25 microns to about 100 microns.

28. The composition for a magnetic composite of claim 18 wherein the magnetic powder has a mean particle size from about 35 microns to about 55 microns.

29. The composition for a magnetic composite of claim 18 wherein the magnetic powder has a mean particle size with a value of standard deviation less than about 150 microns.

30. The composition for a magnetic composite of claim 18 wherein the magnetic powder has a mean particle size with a value of standard deviation less than about 75 microns.

31. The composition for a magnetic composite of claim 18 wherein the magnetic powder has a mean particle size with a value of standard deviation less than about 50 microns.

32. The composition for a magnetic composite of claim 18 wherein the magnetic powder has a mean particle size with a value of standard deviation less than about 20 microns.

33. The composition for a magnetic composite of claim 18 wherein the magnetic composite contains mold release agents selected from the group consisting of stearyl stearate, beeswax, montan wax, paraffin wax and combinations thereof.

* * * * *